(12) United States Patent
Bruce

(10) Patent No.: US 6,293,290 B1
(45) Date of Patent: Sep. 25, 2001

(54) VEHICLE WASH SYSTEM

(75) Inventor: Donald J. Bruce, Grand Marsh, WI (US)

(73) Assignee: Wonder Wash Management, Inc., La Crosse, WI (US)

( * ) Notice: Subject to any disclaimer, the term of this patent is extended or adjusted under 35 U.S.C. 154(b) by 0 days.

(21) Appl. No.: 09/277,420

(22) Filed: Mar. 26, 1999

Related U.S. Application Data (60) Provisional application No. 60/079,539, filed on Mar. 27, 1998.

(51) Int. Cl.[7] .................................................. B08B 3/02
(52) U.S. Cl. ................................. 134/100.1; 134/102.1; 134/123
(58) Field of Search ............................... 134/123, 95.3, 134/100.1, 102.1

(56) References Cited

U.S. PATENT DOCUMENTS

| | | | |
|---|---|---|---|
| 2,740,414 | * | 4/1956 | Moskow ................... 134/123 |
| 3,438,580 | * | 4/1969 | Siebring .................. 134/123 |
| 3,438,583 | * | 4/1969 | Lawrence, III .......... 134/123 |
| 3,447,505 | * | 6/1969 | Wagner .................... 134/123 |
| 3,578,001 | * | 5/1971 | Attaway . |
| 3,595,268 | * | 7/1971 | Archer . |
| 3,679,134 | * | 7/1972 | Nixon . |
| 3,763,822 | * | 10/1973 | Thompson . |
| 3,797,744 | * | 3/1974 | Smith . |
| 4,106,516 | * | 8/1978 | Wiegand . |
| 4,436,113 | * | 3/1984 | Finger . |
| 4,512,814 | * | 4/1985 | Buck . |
| 4,711,257 | | 12/1987 | Kobayashhi . |
| 4,718,439 | | 1/1988 | Gorra et al. . |
| 4,726,388 | | 2/1988 | Swinehart et al. . |
| 4,809,720 | | 3/1989 | Heraty . |
| 4,830,033 | * | 5/1989 | Hanna . |
| 4,848,384 | * | 7/1989 | Christopher et al. ........ 134/123 |
| 4,852,199 | | 8/1989 | Holbus . |
| 5,098,023 | * | 3/1992 | Burke ....................... 134/123 |
| 5,266,123 | | 11/1993 | Brand . |
| 5,291,906 | | 3/1994 | White . |
| 5,363,865 | | 11/1994 | Brand . |
| 5,363,868 | | 11/1994 | Whatley, Sr. . |
| 5,409,310 | * | 4/1995 | Owczarz . |
| 5,425,815 | * | 6/1995 | Parker et al. . |
| 5,452,859 | | 9/1995 | Flaxman . |
| 5,545,335 | * | 8/1996 | Sween et al. . |
| 5,575,852 | | 11/1996 | Chase . |
| 5,637,103 | * | 6/1997 | Kerwin et al. . |
| 5,655,713 | | 8/1997 | Gibney et al. . |
| 5,695,293 | | 12/1997 | Chase . |
| 5,704,991 | * | 1/1998 | Marcus . |
| 5,806,542 | | 9/1998 | Hoffer et al. . |

FOREIGN PATENT DOCUMENTS

676045 * 7/1952 (GB) .................................... 134/123

* cited by examiner

Primary Examiner—Frankie L. Stinson
(74) Attorney, Agent, or Firm—Craig A. Fieschko, Esq.; DeWitt Ross & Stevens S.C.

(57) ABSTRACT

A vehicle wash system is shown and described which is particularly suitable for use in in-bay washing devices, i.e., tunnels or supporting frameworks wherein vehicles are parked and washed while they are stationary. Chemical lines supply chemicals (such as detergents, waxes, etc.) to water lines, and the chemicals and water are mixed in downstream mixing modules. The mixing modules are preferably provided in the form of vessels having enlarged flow areas, and may contain baffles or other turbulence generators therein. The chemical/water mixtures leave the mixing modules in post-mix lines to which gas supply lines may be connected for the purpose of generating foam, which is then delivered in the wash bay from a downstream delivery system. The downstream foam pressure has little or no effect on upstream mixing of chemicals and water, and thus foam having highly uniform properties is generated.

21 Claims, 4 Drawing Sheets

VEHICLE WASH SYSTEM

CROSS-REFERENCE TO RELATED APPLICATIONS

This application claims priority under 35 USC §119(e) to U.S. Provisional Patent Application 60/079,539 filed Mar. 27, 1998, the entirety of which is incorporated by reference herein.

FIELD OF THE INVENTION

This disclosure concerns an invention relating generally to apparata and methods for washing vehicles, e.g., automobiles.

BACKGROUND OF THE INVENTION

Two types of vehicle wash systems are in common use. The first type is conveyorized or "tunnel" wash systems, wherein the vehicle is washed while it is in motion. Generally, a vehicle owner drives his/her vehicle onto a conveyor which carries the vehicle through a tunnel. As the vehicle travels through the tunnel, wash apparata suspended from the walls of the tunnel wet the vehicle, apply cleaning and coating agents, brush the vehicle, rinse the vehicle, etc. Conveyorized wash systems occupy substantial space are expensive to build and maintain, largely because their conveyor systems, which are critical to operation, require a high degree of care. Additionally, conveyorized wash systems must generally have an operating technician present while running in case problems arise during washing.

A second form of wash system is the in-bay system, which is used to wash vehicles while they are stationary. The in-bay system utilizes a wash bay situated within a short tunnel or a supporting framework. The tunnel walls (or other supporting framework) support wash apparata about the sides of a stationary vehicle, which can be driven into and parked within the wash bay. The wash apparata are then actuated to wash the vehicle. Two types of in-bay systems are in common use.

The first type of in-bay wash system is the in-bay manual wash system, wherein boom- or carriage-mounted nozzles may be manually positioned in convenient locations by vehicle owners standing within the bay and outside their vehicles, and may then be manually actuated to wash their vehicles. In-bay manual wash systems have become increasingly popular in recent years owing to their relatively low installation and maintenance costs and their ability to be left for vehicle owners' usage without the presence of operating technicians. These factors allow lower usage fees to be passed on to vehicle owners.

The second type of in-bay wash system is the in-bay automatic wash system, wherein wash apparata move about the wash bay (and the vehicle) independently of the vehicle owner's control to automatically execute a wash routine. Alternatively, wash apparata may be stationary within the wash bay and may be so configured that they can still adequately reach and wash most areas of a vehicle within the bay. One common in-bay automatic wash system manufactured by PDQ Manufacturing (Green Bay, Wis., USA) utilizes a carriage which is slightly wider than the standard width of a vehicle, and which rides through the length of the tunnel upon ceiling-mounted tracks. A nozzle-bearing vertical arm (often referred to as a "tower") is mounted on a slide affixed to the carriage so that the slide allows the arm to traverse the width of the tunnel. During a wash routine, the carriage and slide move the arm so that it orbits the vehicle within the drive-in bay and sprays it with water, cleaning agents, coating agents, and air at the appropriate times. Differently-sized vehicles may be automatically accounted for by measuring each vehicle with photoelectronic sensors or other appropriate sensors prior to washing. Such in-bay automatic tower wash apparata are often used in combination with floor-mounted sprinklers which also wash the underside of a vehicle.

In-bay automatic systems, like conveyorized systems, are popular among vehicle owners because they need not leave their vehicles or risk getting wet by manually washing their vehicles. They are also popular among proprietors of vehicle washing establishments because two to four in-bay automatic systems can be installed in the same space as an average conveyorized system, and thus they allow higher throughput of vehicles and greater customer turnaround. However, in-bay automatic wash systems also suffer from several disadvantages.

Initially, since in-bay automatic wash systems must perform all of the activities of conveyorized systems in a far smaller space and while their components are in motion, in-bay systems require greater mechanization and more sophisticated control systems, and are thus quite expensive.

Additionally, in order to save the space that would be occupied by multiple nozzles and fluid delivery systems, in-bay systems should ideally be able to deliver water, cleaning agents, coating agents, and/or other chemicals through the same nozzles. This requires a far more complicated fluid mixing, transport, and delivery system than a conveyorized system, which can use separate fluid delivery systems situated at different points of the conveyorized route to apply different fluids. The problem with using the same mixing, transport, and delivery system for different wash agents is that a system which is well-suited for handling water may not be well-suited for handling detergents, waxes, etc. having significantly different properties (i.e., viscosities, densities, miscibilities, surface tensions, application temperatures, corrosivities, and the like). The situation is compounded in that manufacturers of vehicle washing agents, rather than trying to develop a single "universal" wash agent which will accommodate all washing, coating, etc. needs, are instead involved in efforts towards greater discretization of washing agent functions: they are producing multiple chemicals for application to vehicles at different times or through different nozzle sets, with each chemical providing a different function in the washing process. An example of such chemicals is the TRIPLESHINE chemicals manufactured by Turtle Wax (Chicago, Ill., USA), which is a trio of highly concentrated foaming chemicals which are mixed with water and applied through separate nozzle sets or at separate times during the wash process. The three TRIPLESHINE chemicals respectively include a grime-removing agent, a protective coat and shine agent, and a ultraviolet inhibitor agent. TRIPLESHINE products are extremely effective and are in demand from both wash system proprietors and users, but they are difficult to apply in in-bay systems. The greatest difficulty arises from their foaming properties. When applied through standard in-bay systems, foam formation tends to cause changes in the line pressure of the fluid mixing and delivery system, which in turn affects the mixing ratios of the chemicals and water. Nozzles first begin spraying, then foam builds so heavily that the generated back pressure interrupts spray, then non-foamed chemical-weak fluid is ejected because the high line pressure decreases chemical delivery, and the process then repeats itself as line pressure drops. Throughout this period, the water/chemical composition of the spray varies widely.

This effect is amplified owing to the fact that most pumping systems suitable for accurately metering small amount of chemicals deliver the chemicals in a "pulsed" fashion, that is, chemicals are accurately delivered when flow rates are averaged over larger timespans, but chemical delivery varies widely over shorter timespans owing to pump intake and output cycling. Even where pump cycles are spaced apart by only a second or so, this can significantly affect consistency because "rich" charges of chemical will foam dramatically upon mixing with air and thus have a significant impact on line pressure.

Another problem is that foaming products are often sprayed at such a weak pressure that their cleaning power is greatly diminished. It is conventional for many in-bay systems to simply use water from standard municipal water supplies at standard supply pressure (approximately 60 PSI). Products which foam prior to or at ejection can raise the back pressure on the line to such an extent that ejection pressure is greatly decreased, resulting in weak spray.

SUMMARY OF THE INVENTION

The invention which this disclosure concerns relates to a wash system which is particularly suited for in-bay use; which is simple and relatively inexpensive in construction; and which allows effective and consistent mixing and delivery of fluids having widely different properties, at a variety of pressures, even where such fluids are foaming and where multiple fluids are to be delivered through the same nozzle sets.

DETAILED DESCRIPTION OF PREFERRED VERSIONS OF THE INVENTION

In the drawings, wherein the same features are designated among different Figures with the same reference numerals, FIGS. 1–4 schematically illustrate a first and particularly preferred version of the invention. The features of the invention illustrated within the separate FIGS. 1–4 are discussed in turn below.

Water Supply Section (100)

Figure 1:
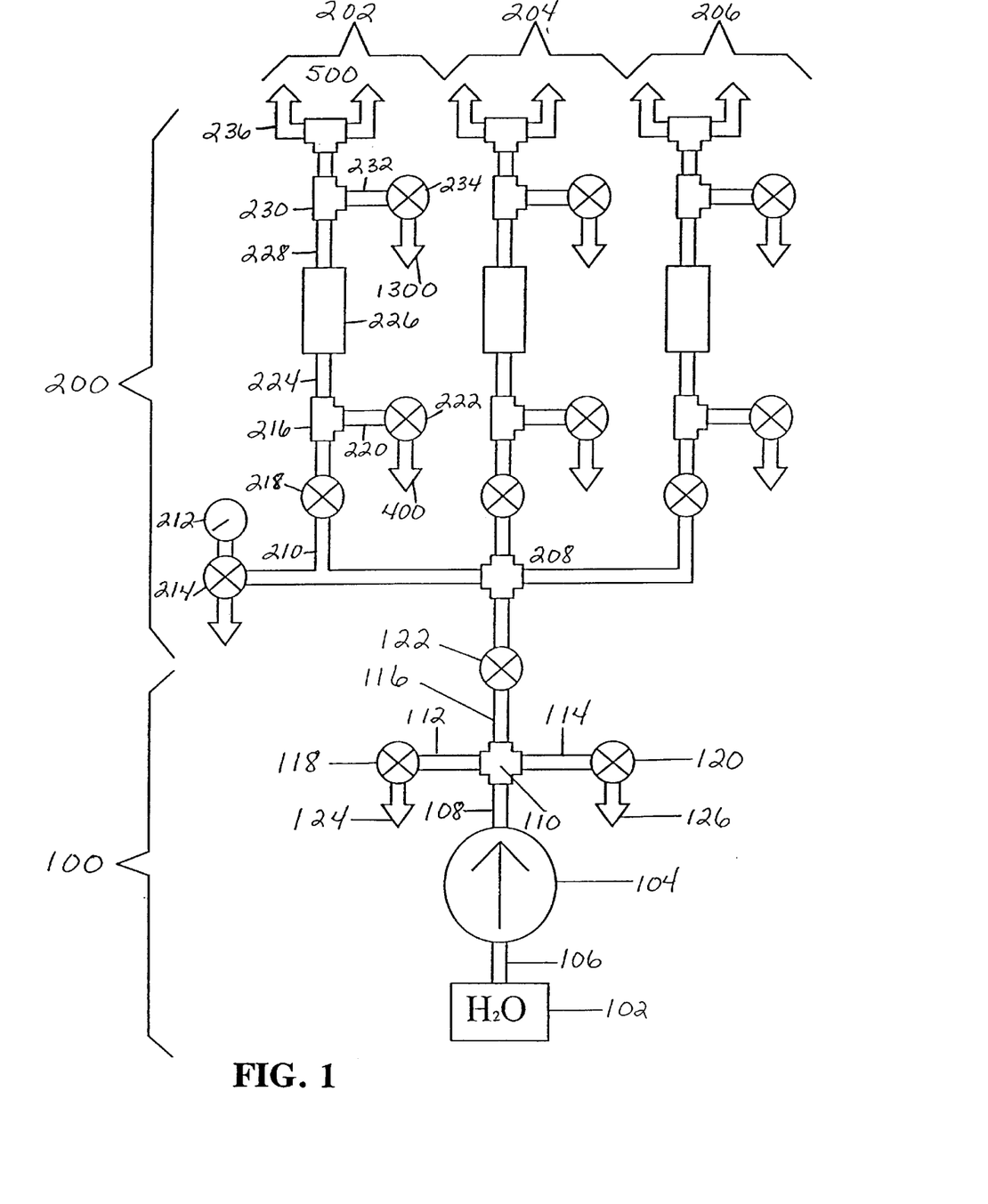
FIG. 1 is a schematic view of the water supply section and mixing section of a first preferred version of the invention.

FIG. 1 illustrates the water supply section 100 and mixing section 200 of the first preferred version of the invention. Within the water supply section 100, a water source, e.g., a municipal water line, is shown at 102. Ultimately, all that needs to be done in the water supply section 100 is to provide water from water source 102 to the mixing section 200. However, the first preferred version of the invention includes several components in its water supply section 100 which perform additional functions.

Initially, a pump 104 is connected to water source 102 via line 106, which serves as a low-pressure inlet to pump 104. The pump 104 increases water pressure so that a high-pressure water outlet is provided at line 108. In the first preferred version of the invention, pump 104 is a CAT 3535 pump (Cat Pumps Corporation, Minneapolis, Minn., USA) capable of delivering up to 35 gallons of water per minute, and which may be actuated by electronic control systems (e.g., the programmable logic controller discussed at greater length below). Unlike the simplified schematic view of pump 104 shown in FIG. 1, the CAT 3535 pump in reality has two low-pressure inlets and two high-pressure outlets. The opposite sides of the pump both bear one inlet and one outlet to more conveniently allow inlet and outlet lines extending in desired directions. The dual inlet/outlet scheme also readily allows combination of input fluids (e.g., water and chemicals) within the pump and/or division of outlet streams coming from the pump. However, in the first version of the invention, it has only been found necessary to use a single inlet and a single outlet in pump 104 to obtain suitable results.

Line 108 conveys high-pressure water from pump 104 to 4-way cross tee 110, which in turn provides water to lines 112, 114, and 122. Lines 112 and 114 respectively lead to tower wash system 124 and underbody wash system 126. Tower wash systems 124, which are known devices available through wash system manufacturers, are available in a variety of models for cleaning vehicle bodies. Underbody wash systems 126, which are also known devices available in a variety of models, may include floor-mounted sprayers and the like for cleaning the undersides of vehicles. Line 116 then leads to mixing section 200, which will be discussed at greater length below.

Valves 118, 120, and 122 are preferably provided on lines 112, 114, and 122 to allow tower and underbody wash systems 124 and 126 and mixing section 200 to be selectively isolated from supplied water when desired. The valves 118, 120, and 122 are preferably electronically-actuated valves, e.g., DEMA 454 solenoid valves (DEMA, St. Louis, Mo., USA) suitable for use with electronic control systems, thereby allowing programmable logic controllers or the like to selectively supply water to any one or more of the tower wash system 124, underbody wash system 126, and mixing section 200 when desired. As an example, a programmable logic controller could first actuate the underbody wash system US to wash the underside of the car; could then close valve 120 and open valve 118 to actuate the tower wash system 124; and could then open valve 122 to allow water to be supplied to the mixing section 200. Most preferably, valves 118, 120, and 122 are normally closed, but valve 122 is maintained in a powered state (i.e., is open) so long as valves 118 and 120 are not powered. This arrangement prevents pump 104 from "dead-heading" against closed valves in the event of power failure in the valve actuation circuit. However, other valve arrangements could be used. As an example of an alternate valve arrangement, all valves 118, 120, and 122 could be kept normally closed and a pressure relief valve and water outlet could simply be installed downstream from pump 104 and prior to valves 118, 120, and 122.

Mixing Section (200)

In FIG. 1, mixing section 200 is entered via line 116 from the water supply section 100. A 4-way cross tee 208 supplies water to water supply lines 210 and additionally to pressure gauge 212 and pressure relief valve 214, which allows release of water to a drain or other outlet in the event line pressure reaches undesirable predetermined levels. In practice, a 0-600 PSI liquid filled gage is used for pressure gauge 212, and an SMC 555 in-line regulator (SMC/

Kinequip Inc., Buffalo, N.Y., USA) is used for pressure relief valve 214.

Three water supply lines 210 are shown, each respectively leading to a mixing module 202, 204, and 206 wherein chemicals are mixed with the water supplied by water supply lines 210. In the first preferred embodiment of the invention, TRIPLESHINE chemicals are used; thus, one mixing module is provided for each of the TRIPLESHINE chemicals, and each mixing module is substantially identical. Accordingly, only the structure of mixing module 202 will be specifically described below and labeled in the Figures, but it should be understood that this description also generally applies to mixing modules 204 and 206 as well.

Water supply lines 210 lead to T-connectors 216, and are preferably separated therefrom by check valves 218. Chemical supply lines 220, which are preferably equipped with check valves 222, then lead from T-connectors 216 to the chemical supply section 400 (which is partially illustrated in FIG. 3 and which is discussed at greater length below). Premix lines 224 also exit the T-connectors 216, and these lines preferably include swivel couplings for easy disconnection for maintenance purposes. Chemical supply lines 220 from the chemical supply section 400 thus provide chemicals to premix lines 224 provided valves 222 are open and chemical supply section 400 is supplying chemicals, and water supply lines 210 simultaneously provide water to premix lines 224 provided valves 218 are open and water supply section 100 is supplying water.

The valves 218 and 222 respectively prevent the upstream flow of chemicals and water to the water supply section 100 and the chemical supply section 400, allowing the chemical/water mixture to only flow downstream to premix lines 224. While valves 218 and 222 could be electronically actuated valves or other types of valves, standard ball-and-spring check valves are suitable. A suitable valve for use as valve 218 is a SMC 1200 PSI check valve with 7 lbs. opening pressure (SMC/Kinequip Inc., Buffalo, N.Y., USA). Valve 222 has been provided by a stock valve supplied with the preferred version of chemical pump 404 (discussed below).

The premix lines 224 then supply the chemical/water mixture to mixing chambers 226. The mixing chambers 226 provide a flow area which is enlarged with respect to the preceding flow area (i.e., the flow area within premix lines 224) so that turbulence is generated within the mixing chambers 226, thoroughly mixing the chemicals and water. It is believed that mixing chambers 226 which have a flow area (i.e., an area measured in a plane perpendicular to the direction of fluid flow) greater than approximately two times the preceding flow area work particularly well. In the first preferred version of the invention, the mixing chambers 226 are 2 in. (5 cm) in diameter and 36 in. (91 cm) long, and appear to provide complete mixing when water and chemicals are supplied from ¾ inch (2 cm) premix lines 224 at standard pressures (i.e., those at and above standard municipal water supply pressures). The mixing chambers 226 should be made of material which is resistant to corrosion by chemicals and water, and standard PVC (schedule 80) plastic piping has been found to be suitable for use in constructing mixing chambers 226.

Postmix lines 228 exit mixing chambers 226 and lead to T-connectors 230. Gas supply lines 232, which are preferably equipped with check valves 234, then lead from T-connectors 230 to the gas supply section 300 (which is partially illustrated in FIG. 2 and which is discussed at greater length below). Wash lines 236 also exit T-connectors 230. Gas supply lines 232 thus provide gas to wash line 236 (and to any chemical/water mixture therein) provided valves 234 are open and gas supply section 300 is supplying gas. Valves 234 prevent the upstream flow of chemicals and water to the gas supply section 300, and as with valves 218 and 222, standard check valves are suitable for use as valves 234 (though other types of valves could be used).

The introduction of gas at T-connector 230 causes the chemical/water mixture to foam heavily, at least where TRIPLESHINE chemicals are used. The gas/chemical/water mixture is then delivered through wash line 236 to the delivery section, which is partially illustrated by section 500 in FIG. 4 and which is discussed at greater length below. For purposes of clarity at this point, it is noted that FIG. 1 illustrates the wash lines 236 as each being furcated into two branch lines in each of the mixing modules 202, 204, and 206 because in the first preferred version of the invention, each mixing module supplies one such branch to one delivery section 500 such as the one illustrated in FIG. 4. In other words, the first preferred version of the invention utilizes two delivery sections 500 such as the one illustrated in FIG. 4, and each delivery section 500 receives a wash line 236 from each mixing module 202, 204, and 206.

Gas Supply Section (300)

Figure 2:
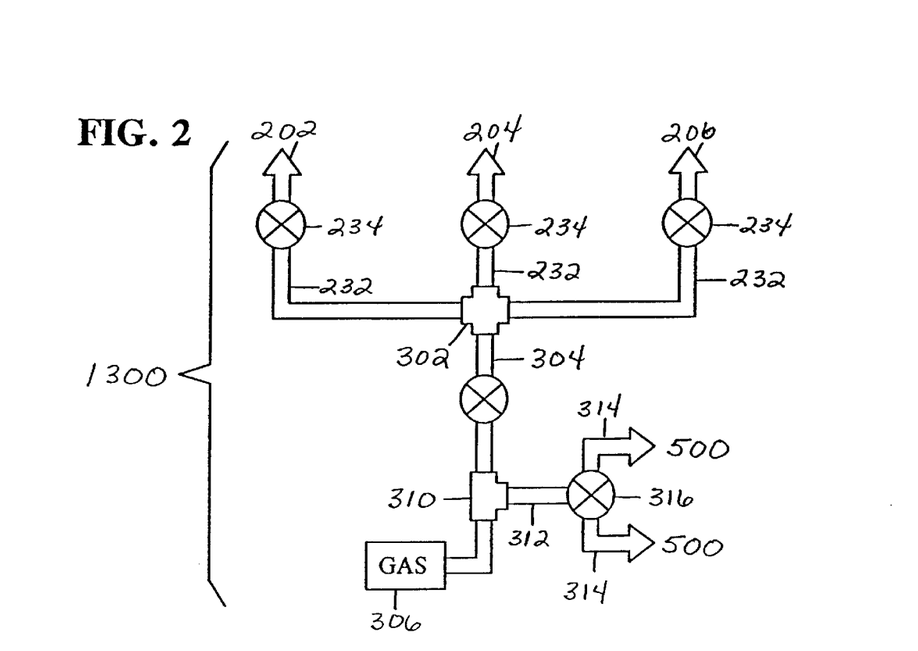
FIG. 2 is a schematic view of the gas supply section of the version of FIG. 1.

Turning to FIG. 2, the gas supply section 300 is shown. The gas supply lines 232 from the three mixing modules 202, 204, and 206 (shown in the mixing section 200 of FIG. 1) join at 4-way cross tee 302 so that they may jointly be supplied with gas from Main gas supply line 304. Main gas supply line 304 is connected to a gas supply 306, but is preferably separated therefrom by an electronically-actuated valve 308 (similar to valves 118, 120, and 122 noted above) so that gas supply to the mixing section 200 may be actuated when desired. The gas supply 306 will generally be an air compressor supplying compressed atmospheric air, though air, carbon dioxide, or other gases could be supplied via compressors, pressurized canisters or other pressurized gas sources. Preferably, air compressors rated at 5 hp or greater are used.

T-connector 310 is shown connecting the gas supply 306 to main gas supply line 304, and also to another line 312. Line 312 is connected to actuator lines 314 via valve 316, which is preferably an electrically-actuated valve capable of providing continuously variable output pressure in actuator lines 314. As will be discussed below, actuator lines 314 are each used for pneumatic actuation purposes in one delivery section 500 such as the one illustrated in FIG. 4.

Chemical Supply Section (400)

Figure 3:
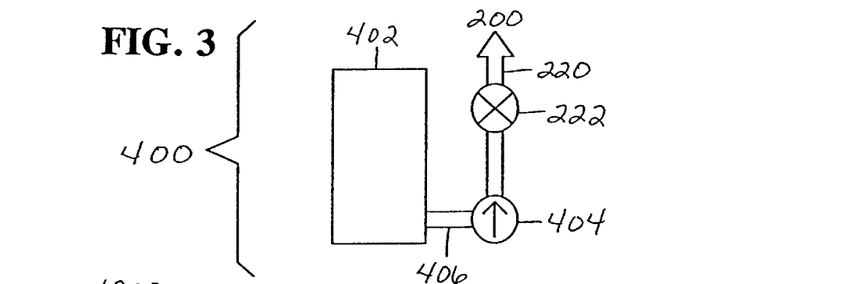
FIG. 3 is a schematic view of the chemical supply section of the version of FIG. 1.

A portion of the chemical supply section 400 is illustrated in FIG. 3, it being understood that for the first preferred version of the invention illustrated in FIG. 1, the apparata shown in FIG. 3 are provided in triplicate (one for each chemical supply line 220 and for each chemical in the TRIPLESHINE trio). Chemical tanks 402, e.g., 15 gallon tanks, are provided for retaining chemicals for supply to the mixing section 200. The chemical tanks 402 are connected to chemical pumps 404 via lines 406. In the first preferred version of the invention, the chemical pumps 404 are Blue-White low volume diaphragm pumps (Blue-White Industries, Westminster, Calif., USA), although other pumps could be used as well. The Blue-White pumps provide chemical flow to chemical supply line 220 which is roughly linear with water flow in water supply line 210, thereby providing relatively consistent percentages of chemicals and water to premix line 224 regardless of the water flow rate in water supply line 210. The inclusion of valves (e.g., valves 222) on the lines connecting chemical pumps 404 to the mixing section 200 is recommended for regulating the back pressure on chemical pumps 404 so that uniform chemical supply to the mixing section 200 can be expected, and also to prevent backflow of water from chemical supply lines 220 of the mixing section 200 back to chemical supply 400.

Delivery Section (500)

Figure 4:
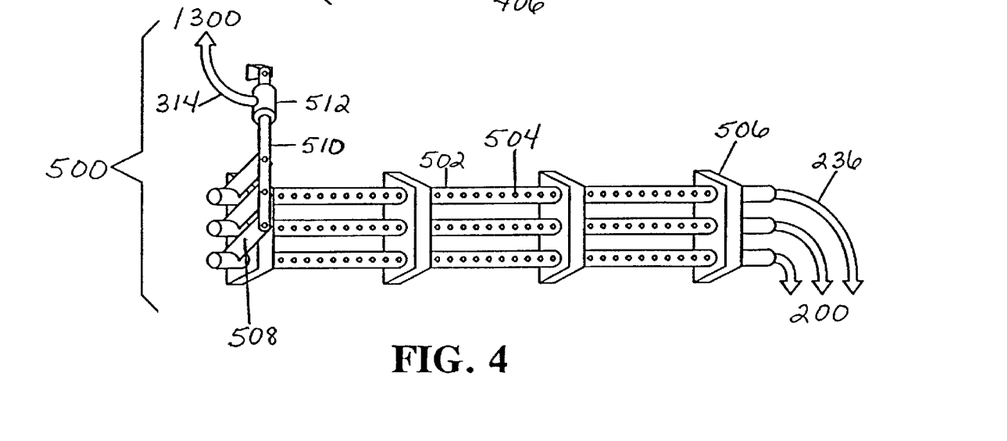
FIG. 4 is a schematic view of the delivery section of the version of FIG. 1.

A portion of the delivery section 500 is illustrated in FIG. 4, it being understood that for the first preferred version of the invention illustrated in FIG. 1, two of the apparatus shown in FIG. 4 are provided (one for each line 314 from the gas supply section 300, and for each set of mixing modules 202, 204, and 206). Each apparatus is mounted on the opposite walls of a drive-in bay so that they extend horizontally along the length of the bay and parallel to the sides of a vehicle situated in the bay. Referring to FIG. 1, each of the divided lines 236 from the mixing modules 202, 204, and 206 has one branch leading to a respective delivery tube 502. In other words, each delivery tube 502 receives a gas/chemical/water mixture from a respective mixing module 202, 204, and 206. The delivery tubes 502 each contain fluid delivery orifices 504 which allow any gas/chemical/water mixture within the delivery tubes 502 to spray therefrom if sufficient pressure exists in lines 236.

The delivery tubes 502 are each rotatably mounted within brackets 506 which are affixed to a wall of the drive-in bay. Brackets 506 made of ultra-high molecular weight plastics are particularly suitable because such brackets have a low coefficient of friction and allow free rotation of the delivery tubes 502 therein when the delivery tubes 502 are borne within apertures having diameters sized approximately 125% those of the delivery tubes 502. Thus, such brackets 506 avoid the need for bearings or the like, and they also resist ice formation and corrosion.

Lever arms 508 then extend from each of the delivery tubes 502. These lever arms 508 are rotatably pinned to a common driver link 510 which is actuated by a pneumatic cylinder 512, this cylinder 512 being connected to one of the gas lines 314 from the gas supply section 300. Extension and retraction of the driver link 510 via the cylinder 512 causes the delivery tubes 502 to rotate within brackets 506. The delivery tubes 502 can be rotated in this fashion as gas/chemical/water mixture is being sprayed from their fluid delivery orifices 504 so that a vehicle situated adjacent the delivery tubes 502 is more thoroughly covered with gas/chemical/water mixture.

When operating the first preferred version of the invention, all of valves 218, 222, and 234 are initially opened so that a gas/chemical/water mixture is created and provided to the delivery tubes 502. The fluid delivery orifices 504 within the delivery tubes 502 are dimensioned in relation to the delivery tubes 502 in such a manner that the entirety of the delivery tubes 502 fills with mixture prior to allowing the ejection of mixture through fluid delivery orifices 504 at standard operating pressure. Suitable results have been obtained where the delivery tubes 502 are 9' (2.75 m) long, 1" (2.5 cm) diameter Excelan tubes bearing $\frac{1}{16}"-\frac{3}{16}"$ (0.16 cm–0.48 cm) fluid delivery orifices placed approximately every 9" (23 cm). The lines 236 leading to each of the delivery tubes 502 are provided by ½" (1.25 cm) flexible vinyl tubes. Both the delivery tubes 502 and the lines 236 are transparent, allowing vehicle owners situated within the bay (e.g., owners sitting within their vehicles in the bay) to see the tubes rapidly fill with and then eject gas/chemical/water mixture. After the desired amount of gas/chemical/water mixture is applied to the vehicle, valves 222 can be closed to isolate the chemical supply section 400 from the delivery system 500, and the valves 122/218 and/or 308/234 can be opened to purge the delivery tubes 502 of gas/chemical/water mixture with inflowing water and/or gas.

When operating the first preferred version of the invention, all of valves 218, 222, and 234 are initially opened so that a gas/chemical/water mixture is created and provided to the delivery tubes 502. The fluid delivery orifices 504 within the delivery tubes 502 are dimensioned in relation to the delivery tubes 502 in such a manner that the entirety of the delivery tubes 502 fills with mixture prior to allowing the ejection of mixture through fluid delivery orifices 504 at standard operating pressure. Suitable results have been obtained where the delivery tubes 502 are 9' (2.75 m) long, 1" (2.5 cm) diameter Excelan tubes bearing $\frac{1}{16}"-\frac{3}{16}"$ (0.16 cm–0.48 cm) fluid delivery orifices placed approximately every 9" (23 cm). The wash lines 236 leading to each of the delivery tubes 502 are provided by ½" (1.25 cm) flexible vinyl tubes. Both the delivery tubes 502 and the wash lines 236 are transparent, allowing vehicle owners situated within the bay (e.g., owners sitting within their vehicles in the bay) to see the tubes rapidly fill with and then eject gas/chemical/water mixture. After the desired amount of gas/chemical/water mixture is applied to the vehicle, valves 222 can be closed to isolate the chemical supply section 400 from the delivery system 500, and the valves 122/218 and/or 308/234 can be opened to purge the delivery tubes 502 of gas/chemical/water mixture with inflowing water and/or gas.

Second Preferred Version of the Invention

Figure 5:
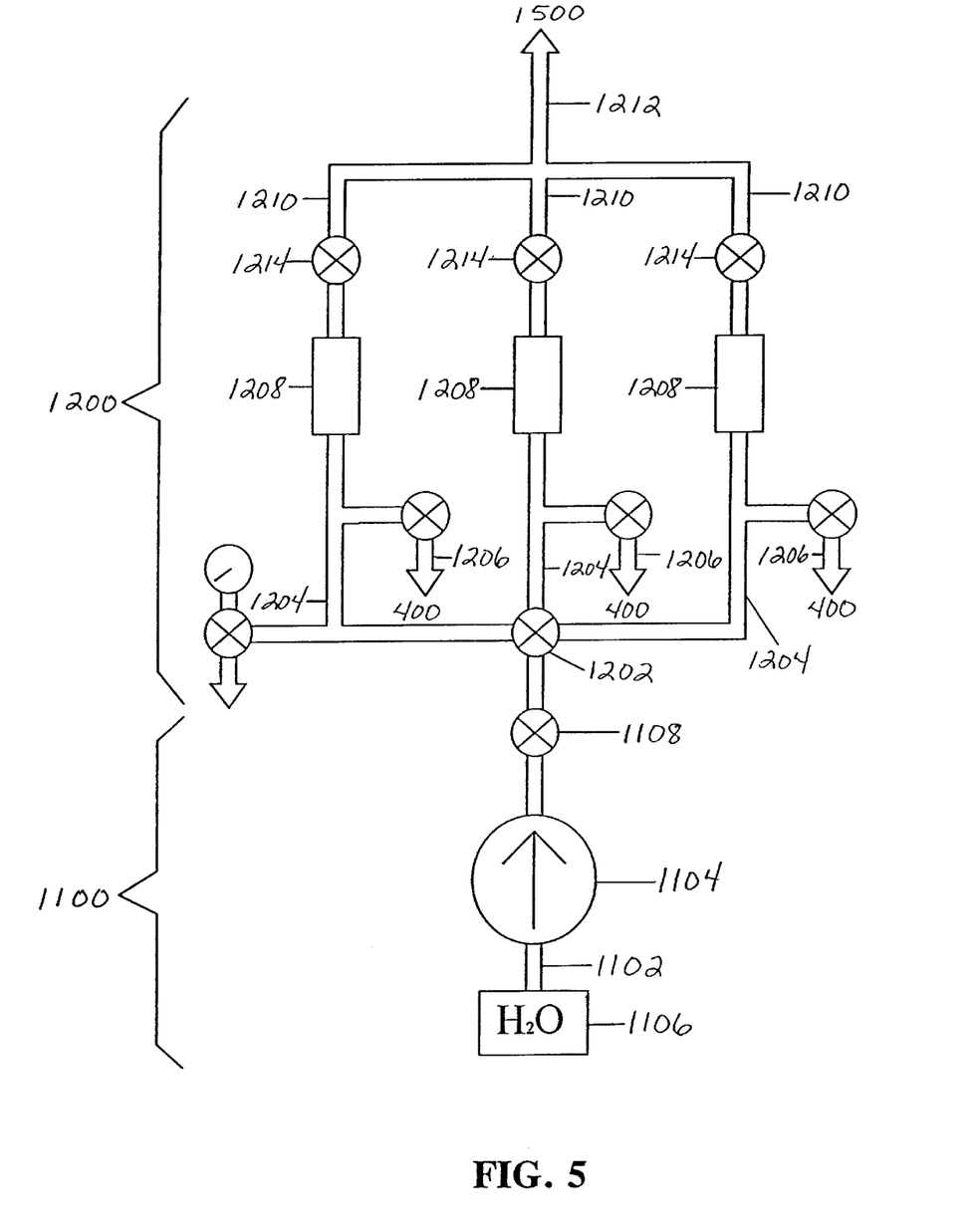
FIG. 5 is a schematic view of the water supply section and a portion of the mixing section of a second preferred version of the invention.
Figure 6:
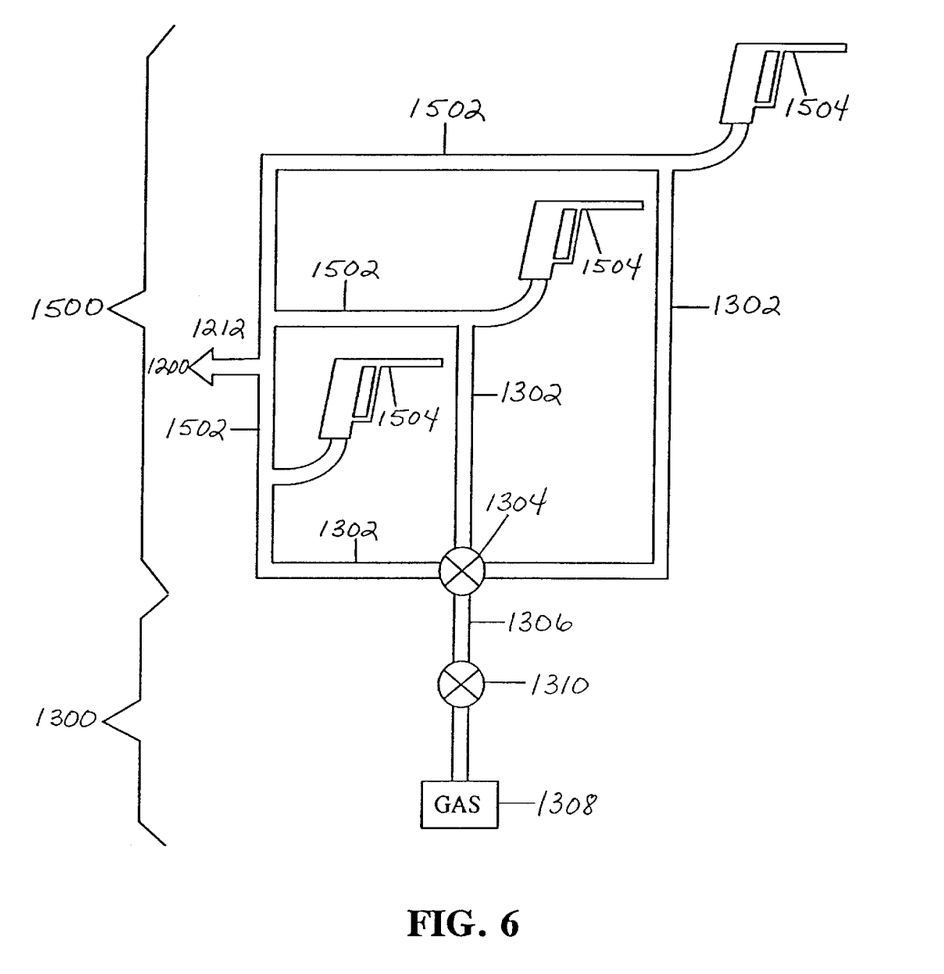
FIG. 6 is a schematic view of the delivery section and a portion of the mixing section of the version of FIG. 5.

FIGS. 5 and 6 illustrate a second preferred version of the invention which is adapts the first version of the invention illustrated in FIGS. 1–4 for use in multiple bays of a manual in-bay wash system. Referring to FIG. 5, a water supply section 1100 is provided which is generally similar to the water supply section 100 of FIG. 1, but wherein lines to tower wash systems 124, underbody wash systems 126, etc. are omitted. A water supply line 1102, which may include a pump 1104 to raise line pressure, leads from a water supply 1106 to a mixing section 1200. A standard check valve/regulator 1108 is preferably provided on water supply line 1102 prior to entry of the mixing section 1200 to prevent backflow of fluid from mixing section 1200 to water supply section 1100.

At the entry of the mixing section 1200, the water is supplied to an electrically actuated three-way valve 1202, e.g., a single inlet/triple outlet solenoid block, so that an electronic control system can sequentially shift water flow from water supply line 1102 to any one of the three outlets of the three-way valve 1202. Three premix lines 1204 are each provided at an outlet of the three-way valve 1202, each bearing a mixing module similar to those shown and described for FIG. 1. Only one of the premix lines 1204 and its corresponding mixing module will be described in detail below, though this description generally applies to all premix lines 1204. Additionally, for sake of simplicity, standard fixtures such as T-connectors and cross tees will be omitted from the following discussion and drawings, it being understood that these may be used where different lines join.

Chemical supply lines 1206 from a chemical supply section 1400 join premix lines 1204. Chemicals and water then travel through premix lines 1204 and are mixed in mixing modules 1208. The fully-mixed chemicals and water exit the mixing modules 1208 through postmix lines 1210, which join at a common line 1212 to enter a delivery section 1500 as a unit. Backflow from the postmix line 1210 of one mixing module into the postmix line 1210 of another mixing module is prevented by including check valves 1214 on each postmix line 1210 prior to line 1212.

Referring to FIG. 6, common line 1212 enters delivery section 1500 and branches to three postmix delivery lines 1502. Each of the postmix delivery lines 1502 ultimately terminates in a hand-held trigger-actuated spray nozzle 1504. Shortly prior to entering the spray nozzles 1504, the postmix delivery lines 1502 are joined by gas supply lines 1302 from a gas supply section 1300. These gas supply lines 1302 serve as the outlets of 3-way valve 1304 (e.g., a single inlet/triple outlet solenoid block similar to valve 1202), which has an inlet line 1306 connected to a gas supply 1308. A valve 1310 may be provided on line 1306 to allow the gas supply 1308 to be isolated from the remainder of the gas supply section 1300 when desired.

In operation, the water supply 1106 is sequentially shifted by 3-way valve 1202 to the premix lines 1204 and their respective mixing modules so that in sequence, each of the TRIPLESHINE chemicals is mixed with water and provided to common line 1212. The chemical pumps (not shown) from each chemical supply line 1206 are rotated to supply chemicals to each premix line 1204 as each line receives water from line 1202. The chemical/water mixture then travels through postmix delivery lines 1502 to be foamed by gas injection via gas supply lines 1302, and then to be ejected at nozzles 1504. Since gas injection occurs quite far downstream from the mixing point (and preferably within the wash bay), the back pressure caused by foaming at the gas injection point will generally not reach to the check valves 1214 to trigger them.

As each nozzle 1504 is actuated, it will apply each of the TRIPLESHINE chemicals in sequence provided it is left open long enough for valve 1202 to provide water to all three premix lines 1204. If more than one nozzle 1504 is being used at any time, the control system can adjust the amount of water provided by water supply 1106 accordingly so that the adequate amount of water is provided at each nozzle 1504 (e.g., if three nozzles 1504 are actuated, pump 1104 can pump three times more water than would be supplied if only a single nozzle 1504 was open). Since the chemical feed through chemical supply lines 1206 varies generally linearly with the amount of water flowing through premix lines 1204, doubling or tripling of the water supply in premix lines 1204 to supply two or three nozzles 1504 similarly doubles or triples chemical flow in chemical supply lines 1206. Therefore, a relatively consistent chemical/water mix is provided in line 1212 regardless of how many nozzles 1504 are in use. It is contemplated that the control system will close each nozzle 1504 after that nozzle has sequenced through all three of the TRIPLESHINE chemicals. If different nozzles 1504 are actuated at different times, the later-actuated nozzle will simply begin spraying a different one of the TRIPLESHINE chemicals than the first-actuated nozzle started with.

It should be understood that while not shown in the Figures, the lines 1502 and 1302 will generally each have substantially the same length, and thereby each have substantially the same pressure drop, so that each will supply approximately the same amount of chemicals/water and gas (i.e., so that one nozzle 1504 will not supply a more chemical/water-rich mix than any other nozzle). If desired, additional valves may be added for pressure regulation (e.g., to ensure that water is equally split from common line 1212 to postmix delivery lines 1502, etc.)

Additionally, it is noted that rather than using a single common line 1212 downstream from the mixing modules 1208, the apparatus of FIGS. 5 and 6 could instead provide lines from each mixing module to each of the spray nozzles 1504 (as in the apparatus of FIGS. 1–3). However, the arrangement shown in FIGS. 5–6 is preferred owing to its simplicity.

Other Versions of the Invention

It must be remembered that the description set out above is merely of one exemplary preferred version of the invention, and it is contemplated that numerous variations to the invention can be made. Following are several examples. It is understood that these examples are not to be construed as describing the only additions and modifications to the invention, and that the true scope of the invention will be defined by the claims included in any later-filed utility patent application claiming priority from this provisional patent application.

First, it is contemplated that lesser or greater numbers of mixing modules 202, 204, and 206 can be used where fewer or more than three chemicals are involved, with a corresponding decrease or increase in the number of chemical tanks 402, etc. As an example, the use of only a single mixing module 202 would be useful in standard vehicle washing systems where a single chemical tank 402 holds detergent.

Second, it is also contemplated that lesser or greater numbers of delivery sections 500 (and corresponding actuator lines 314 from the gas supply section 300 shown in FIG. 2) can be used. As a first example, only a single apparatus as shown in FIG. 4 need be used in a washing bay, and could be mounted on the ceiling over the vehicle so as to provide good vehicle coverage. As a second example, three or more apparata as shown in FIG. 4 could be used in a washing bay, with different apparata being situated at different heights on the bay walls or on different locations on the bay ceiling or floor.

Third, it is also contemplated that the invention may utilize delivery sections 500 different from those described above. As first example, the lever arms 508, driver link 510, and pneumatic cylinder 512 could be replaced by a different driving means for varying the direction of spray delivery. As a second example, the driving means could be eliminated entirely and the delivery tubes 502 can simply be maintained in a static position. In this case, more fluid delivery orifices 504 might be included on the delivery tubes 502 so that a more widely dispersed spray is formed.

Fourth, it should be understood that the mixing chambers 226 are not strictly necessary for the invention. However, while the mixing chambers 226 and other mixing means are not essential, they are highly preferred. It has been found that if the mixing modules are omitted, mixing is incomplete but still substantial. Unfortunately, foam composition varies in the manner noted above: the end product tends to vary between chemical-rich foam and chemical-weak fluid. The enlarged mixing chambers 226 are the preferred form of mixing means owing to their low cost, low likelihood of fouling, and relatively low pressure drop, but other mixing means could be used as well (e.g., by use of baffles or other turbulence generators within the mixing chambers 226). Mixing means may also be provided by situating a number of mixing chambers 226 in series, which may enhance mixing of fluids which are resistant to mixing.

Fifth, if chemicals other than the TRIPLESHINE chemicals are used which foam upon contact with water, or where the generation of foam in the chemical/water mixture is not desired, the use of gas supply section 300 may not be necessary. This allows simplification of components downstream from premix line 224 (e.g., elimination of the mixing chamber 226, T-connector 230, etc.). Of course, valve 234 may simply be kept shut if introduction of gas is undesirable.

Sixth, it should be apparent from the second version of the invention of FIGS. 5 and 6 that the point of gas injection can be located differently in the first version of the invention than in the manner described above. It is preferable to provide injection of gas upstream the chemical injection point within the water line (and also preferably upstream from a mixing module) since this provides foamed products at the delivery section 500 with far more consistent composition. Also, where gas is injected after mixing, foam is followed by a high-pressure liquid front which rapidly ejects the foam from the tubes.

Seventh, it should be understood that in the preceding description and drawings, many valves are described and illustrated which are not strictly necessary to practice the invention, but which are noted above because they are believed to provide particularly advantageous results. It is also noted that additional valves may be added where desired, e.g., at line 106 from water supply 102 so that the entire system may be isolated from water supply 102, at line 116 downstream from valve 122 so that the mixing system 200 may be isolated from water supply 102, etc.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims.

What is claimed is:

1. A vehicle wash system comprising:
   a. one or more water supply lines;
   b. one or more chemical supply lines, each chemical supply line joining one of the water supply lines at a respective first juncture;
   c. one or more premix lines, each premix line being situated downstream from one of the first junctures;
   d. two or more mixing chambers, each mixing chamber being situated downstream from one of the premix lines, each mixing chamber having a flow area greater than the flow area of its upstream premix line;
   e. one or more postmix lines, each postmix line being situated downstream from one of the mixing chambers;
   f. a delivery system downstream from the one or more postmix lines, the delivery system including one or more hand-held spray nozzles, each spray nozzle bearing one or more fluid delivery orifices thereon;
   g. a fluid switch situated in line with each mixing chamber whereby fluid from each mixing chamber may be selectively supplied to each spray nozzle; and
   h. a vehicle washing bay having a vehicle path through which a vehicle may drive, wherein at least one of the fluid delivery orifices is situated adjacent the vehicle path.

2. The vehicle wash system of claim 1 wherein the flow area of each mixing chamber is at least twice as large as the flow area of its upstream premix line.

3. The vehicle wash system of claim 1 wherein the flow area of each mixing chamber and the flow area of its premix line are both at least substantially circular.

4. The vehicle wash system of claim 1 wherein each mixing chamber is substantially cylindrical.

5. The vehicle wash system of claim 1 wherein each mixing chamber has a flow area greater than the flow area of its downstream postmix line.

6. The vehicle wash system of claim 1 wherein the flow area of each mixing chamber is at least twice as large as the flow area of its downstream postmix line.

7. The vehicle wash system of claim 1 further comprising one or more gas supply lines, each gas supply line joining one of the postmix lines at a respective second juncture.

8. The vehicle wash system of claim 1 further comprising one or more gas supply lines, each gas supply line joining one of the postmix lines at a respective second juncture upstream from the delivery system.

9. The vehicle wash system of claim 1 wherein no pump is situated between the mixing chambers and the delivery system.

10. A vehicle wash system comprising:
    a. one or more water supply lines;
    b. one or more chemical supply lines, each chemical supply line joining one of the water supply lines at a respective first juncture;
    c. one or more premix lines, each premix line being situated downstream from one of the first junctures;
    d. two or more mixing chambers, each mixing chamber being situated downstream from one of the premix lines, each mixing chamber having a flow area greater than the flow area of its upstream premix line;
    e. a postmix line situated downstream from the mixing chambers;
    f. a delivery system downstream from the postmix line, the delivery system having one or more fluid delivery orifices; and
    g. a fluid switch situated between the delivery system and the mixing chambers, whereby fluid from each mixing chamber may be selectively supplied to each spray nozzle.

11. The vehicle wash system of claim 10 wherein the flow area of each mixing chamber is at least twice as large as the flow area of its upstream premix line.

12. The vehicle wash system of claim 10 wherein the flow area of each mixing chamber and the flow area of its premix line are both at least substantially circular.

13. The vehicle wash system of claim 10 wherein each mixing chamber is substantially cylindrical.

14. The vehicle wash system of claim 10 wherein each mixing chamber has a flow area greater than the flow area of the downstream postmix line.

15. The vehicle wash system of claim 10 wherein the flow area of each mixing chamber is at least twice as large as the flow area of the downstream postmix line.

16. The vehicle wash system of claim 10 further comprising a gas supply line joining the postmix line at a second juncture.

17. The vehicle wash system of claim 10 further comprising a gas supply line joining the postmix line at a second juncture, wherein the delivery system is downstream from the second juncture.

18. The vehicle wash system of claim 10 further comprising a vehicle washing bay having a vehicle path through which a vehicle may drive, wherein at least one of the fluid delivery orifices is situated adjacent the vehicle path.

19. The vehicle wash system of claim 10 wherein the delivery system includes one or more elongated delivery tubes, each delivery tube bearing at least one of the fluid delivery orifices thereon.

20. The vehicle wash system of claim 10 wherein the delivery system includes one or more hand-held spray nozzles, each spray nozzle bearing at least one of the fluid delivery orifices thereon.

21. The vehicle wash system of claim 10 wherein no pump is situated between the mixing chambers and the delivery system.

* * * * *